US005800918A

United States Patent [19]
Chartier et al.

[11] Patent Number: 5,800,918
[45] Date of Patent: Sep. 1, 1998

[54] MULTILAYERED HYDROPHOBIC WINDOW GLASS

[75] Inventors: Pascal Chartier, Orsay; Marie-Jose Azzopardi, Paris; Nathalie Codazzi, Ermont; Pierre Chaussade, Sully Sur Loire; Yves Naoumenko, Bray en Val; Fabienne Gauthier, Sully Sur Loire; Olivier Guiselin, Paris, all of France

[73] Assignee: Saint-Gobain Vitrage, Courbevoie, France

[21] Appl. No.: 501,577

[22] Filed: Jul. 12, 1995

[30] Foreign Application Priority Data

Jul. 13, 1994 [FR] France .................................. 94 08734

[51] Int. Cl.$^6$ ......................... B32B 17/06; B05D 5/06
[52] U.S. Cl. ..................... 428/336; 427/165; 428/428; 428/429; 428/432; 428/446; 428/447; 428/688; 428/689; 428/696; 428/698
[58] Field of Search ........................... 428/336, 428, 428/429, 432, 446, 447, 688, 689, 696, 698; 427/165

[56] References Cited

U.S. PATENT DOCUMENTS

| 4,765,729 | 8/1988 | Taniguchi | 351/163 |
| 5,328,768 | 7/1994 | Goodwin | 428/428 |
| 5,595,825 | 1/1997 | Guiselin | 428/428 |

*Primary Examiner*—D. S. Nakarani
*Attorney, Agent, or Firm*—Oblon, Spivak, McClelland, Maier & Neustadt, P.C.

[57] ABSTRACT

A window glass comprising a substrate made of glass, which is optionally covered, at least in part, by one or more layers and a hydrophobic-oleophobic, abrasion-resistant coating comprising an essentially mineral sublayer and a hydrophobic-oleophobic layer, wherein the density of the sublayer is equal to at least 80% of that of its constituent material.

16 Claims, No Drawings

MULTILAYERED HYDROPHOBIC WINDOW GLASS

BACKGROUND OF THE INVENTION

1. Field of the Invention

The invention relates to a "nonwettable" window glass and to the method for its manufacture.

2. Discussion of the Background

The window glasses discussed in the following consist of a mineral or organic glass. They are used, in particular, in vehicles, for example, in the airplane, train, or automobile sectors. They can also be used in the building sector.

The term "wettability" refers to the tendency of polar or nonpolar liquids to adhere to the window glass, forming a disadvantageous film. It also refers to the tendency to retain dust particles of all types.

The presence of a liquid film or of dust alters the visibility through the window glass and decreases its transparency. To overcome these difficulties, it is known to cover the window glasses with a nonwettable coating.

One known coating is prepared from a mixture consisting of a perfluoroalkylsilane and a fluorinated olefinic telomer as described in European Patent Application No. 452,723. Another known coating is the one described in European Patent Application No. 492,545. This coating is based on a fluorinated alkylsilane. It appeared that the properties of these coatings were degraded over time. This is particularly the case with car window glasses, which are subjected to climatic stresses (humidity, UV radiation, . . . ), and also mechanical stresses due, for example, to friction due to windshield wipers and/or polishing or cleaning rags.

To improve the resistance to climatic stresses, European Patent Application Nos. 497,189 and 476,510 describe a coating whose interface with the window glass is made irregular. European Patent Application No. 497,189 describes in greater detail the formation of irregularities with sizes on the order of a micron obtained either by a treatment of the surface of the substrate or by the presence of particles on the substrate or incorporated in a sublayer or in the nonwettable layer. European Patent Application No. 476,510 describes the use of a sublayer that has been rendered irregular by an attack based on hydrofluoric acid or by the action of a plasma.

SUMMARY OF THE INVENTION

However, the obtention of these coatings requires an additional operation for the formation of these irregularities. Moreover, it appeared that the resistance to abrasion of these coatings was not entirely satisfactory.

The purpose of the invention is a nonwettable window glass presenting an improved resistance to climatic stresses and offering, in addition, an improved mechanical resistance, notably a window glass that preserves its properties of nonwettability in spite of the abrasion to which it is subjected.

The invention also relates to a nonwettable functional window glass whose durability is improved, notably the resistance to climatic stresses.

The window glass according to the invention comprises a substrate, notably a substrate made of glass, which is optionally covered, at least in part, by one or more functional layers and equipped with a coating comprising an essentially mineral sublayer and a hydrophobic and oleophobic layer. The density of the sublayer according to the invention is at least equal to 80% of the density of its constituent material.

DETAILED DESCRIPTION OF THE INVENTION

The term "density" is defined as the density of the crystalline forms of the material that constitutes the sublayer. The sublayer according to the invention presents a high density, preferably more than 90% of the density of its constituent material.

The sublayers considered according to the invention are essentially mineral sublayers, that is, sublayers with a minor content of carbon elements. They essentially consist of a material selected from the following substances: $Al_2O_3$, $Ga_2O_3$, $SnO_2$, $TiO_2$, $Ta_2O_5$, $Cr_2O_3$, $ZrO_2$, $Nb_2O_5$, $In_2O_3$, $Fe_2O_3$, $CoO_3$, $V_2O_5$, $Y_2O_3$, TiN, $SiO_x$, with x being between 0 and 2, and $SiO_pC_q$, with p being between 1 and 2 and with q being equal to 0 or 1, alone or in a combination.

Advantageously, the sublayer according to the invention is also very hard. Its hardness is preferably higher than that of glass. Advantageously, it presents a crystalline structure.

The improvement observed according to the invention is probably connected with the number and type of bonds that form between the sublayers and the hydrophobic and oleophobic layer. In fact, they involve atomic configurations corresponding to strong bonds of the covalent type. In addition, the mechanical characteristics of the sublayers impart an improved resistance to abrasion to the coating of the invention. Although the invention is not bound by this interpretation, the sublayer is then capable of absorbing the mechanical stresses that are preferentially propagated in its interior.

To obtain this result, it is advantageous to form sublayers with appropriate thicknesses. The sublayers used according to the invention preferably present a thickness of not less than 80 Å. Moreover, an increase in the thickness beyond a certain limit does not provide any appreciable advantage, and such can degrade the qualities of the transparency of the window glass. For this reason, it is preferred to use layers whose thickness does not exceed 5000 Å.

According to an advantageous variant, the sublayer is conductive [a conductor], capable of evacuating the electrostatic charges present on one side of the window glass, for example. The coating according to the invention thus combines two functions, that is: an electrostatic protection of the window glass and a nonwettability function. The sublayer can be based on a conductive metal oxide. It can also be doped by a component that imparts satisfactory conduction properties to it. Preferably, the sublayer is one based on tin oxide doped with fluorine, at a carrier density between $10^{19}$ and $10^{21}$ per $cm^3$.

To form the sublayers used according to the invention, the known techniques for the formation of such layers are generally applicable. It is thus possible to use a vacuum deposition technique (thermal evaporation, cathodic atomization . . . ). It is also possible to use techniques involving the thermal or ionic decomposition of the CVD (chemical vapor deposition) type, CVD plasma, or layers formed by the pyrolysis of powders, solutions or vapors.

The sublayers formed by pyrolysis are particularly well suited for the implementation of the invention because these layers adhere strongly to the substrate, present a high degree of compactness, and are crystalline.

The sublayer according to the invention can be located on the glass substrate or on any type of layer, for example, a thin layer that may be part of a stack of layers.

According to the invention it is advantageous to use, as a nonwettable layer, a layer that essentially consists of hydrolyzable fluorinated alkylsilanes. They are preferably layers of the monomolecular type obtained from at least one fluorinated alkylsilane whose carbon chain, which may be branched, comprises at least six carbon atoms, with the carbon of the extremity (extremities) being entirely substituted by fluorine. The layer can also be obtained from fluorinated alkylsilanes or from a mixture of fluorinated alkylsilanes and, possibly, a mixture of fluorinated alkylsilanes and silanes of the $SiX_4$ type in which X is a hydrolyzable group.

The fluorinated alkylsilane is preferably a perfluoroalkylsilane with the general formula:

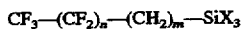

in which:

n is 0 to 12 m is 2 to 5

X is a hydrolyzable group, for example, a chlorinated group or alkoxy group.

Preferably, the perfluoroalkylsilane is selected from the group:

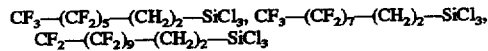

The organosilanes of the type indicated above present the unique characteristic of becoming attached to the sublayer through the intermediary of superficial reactive sites of the sublayer.

By appropriately selecting the conditions of implementation, so-called two-dimensional monomolecular layers are obtained, having a thickness between 10 and 50 Å. The general structure of these layers is, for each organosilane, a covalent bond at the fixation point on the sublayer and two covalent bonds with adjacent organosilane molecules by the two other hydrolyzable functions. The layer so formed is a monolayer with polysiloxane units in which the organosiloxanes are regularly grafted.

The monomolecular layer presents, towards the outside, fluorocarbonated chains in a regular arrangement, with the extremity of the chains constituting the external side of the coated window glass. According to the invention, at least the extremities of the chains are fluorinated, which not only imparts to them a particularly pronounced hydrophobic character, but also a high resistance to aging when the window glass is exposed to UV radiation.

According to the invention, a coating is obtained whose durability, in terms of mechanical and chemical resistance, is improved. The angle of contact of a drop of water with the coating of the invention is more than 60° and, advantageously, more than 75° after the coating has been subjected to abrasion by 500 turns of the abrasive grinding wheel according to the standard ASTM D 1044-78, or after the coating has been maintained for 4 h in boiling demineralized water.

The invention also concerns the method for the preparation of such a coating.

The method notably comprises the following steps:

deposition of the hydrophobic layer on a substrate equipped with a dense and essentially mineral sublayer, after a possible cleaning of said sublayer, by bringing the substrate equipped with the sublayer in contact with a solution containing at least one fluorinated alkylsilane in a nonpolar solvent. This may be a solution based on a fluorinated alkylsilane or a mixture of fluorinated alkylsilanes and, optionally, other silanes.

The cleaning steps, notably the cleaning of the sublayer, are important steps because they determine the number of reactive sites capable of forming a bond between the substrate and the sublayer and between the sublayer and the layer. Naturally, the higher the number of sites, the more rigidly the coating is fixed to the substrate and notably the layer [is] rigidly fixed to the substrate. The cleaning allows the elimination of the absorbed contamination that acts against a good fixation. It should be noted that a sublayer deposited under vacuum does not require any cleaning because it can be considered clean as it leaves the vacuum bell jar.

A method for the preparation of the window glass according to the invention comprises the following steps:

optional cleaning of the surface of the substrate to be coated, deposition of an essentially mineral sublayer, with the density of the sublayer being at least equal to 80% of the density of its constituent material, optional cleaning of the sublayer to be coated, deposition of a hydrophobic and oleophobic layer onto said cleaned sublayer.

The deposition of the sublayer is obtained by the decomposition of molecules and, advantageously, by pyrolysis.

The deposition of the nonwettable layer is conducted by establishing contact between the coated substrate of the sublayer and a solution based on a fluorinated alkylsilane or a mixture of fluorinated alkylsilanes and, optionally, other silanes in a nonpolar solvent system. The reaction time is between 5 and 30 min and, preferably, on the order of 10 min.

The solution comprises an alkylsilane of the type described above, whose concentration varies from $2\times10^{-3}$ to $5\times10^{-2}$ mol/L in a nonpolar solvent system. The choice of solvent is not indifferent and has an influence on the proportion of alkylsilanes grafted onto the substrate. The solvent system consists of at least 80 vol % of a nonpolar solvent and 20% of chlorinated solvent(s). The nonpolar solvent comprises, preferably, a carbon chain whose length is on the same order of magnitude as that of the organosilane used. In other words, the number of carbons of the solvent is overall identical, to the nearest two or three carbons, to the number of carbons present in the carbon chain of the organosilane. The nonpolar solvent is, preferably, selected from n-hexadecane or isooctane, the chlorinated solvent is preferably selected from the group comprising dichloromethane, trichloromethane, trichloroethane, trichloroethylene, trichlorotrifluoroethane, and carbon tetrachloride. A particularly preferred system for the implementation of the invention consists of a nonpolar solvent.

Once treated, the support is ready to be used without any subsequent thermal treatment being necessary.

According to one variant of the invention, the hydrophobic and oleophobic layer is deposited on at least a part of an essentially mineral sublayer whose density is equal to at least 80% of the density of its constituent material, with this sublayer being a part of a functional stacking or itself being a functional layer.

According to a preferred variant, the sublayer essentially consists of silicon oxide and, in particular, of silicon dioxide.

The term "functional layer" or "functional stacking" refers to a layer or a stacking that imparts particular properties to the window glass, notably thermal, optical, or electrical properties.

As a functional stacking, one can cite, for example, an antireflection stacking, a low emissive and/or conductive stacking, or any other type of stacking.

The window glass according to the invention presents, besides the properties imparted by the functional stacking, hydrophobic and oleophobic properties. In addition, it presents resistance of the functional stacking to the climatic conditions, in particular that of the hydrophobic and oleophobic layer. This improvement is notably reasonable for the functional layers deposited, for example, under vacuum and used as external layers, that is, the layers exposed to the climatic conditions.

According to a preferred variant of the invention, the window glass comprises a substrate made of glass, an antireflection stacking including that last layer, that is, the one farthest removed from the substrate is a dense layer consisting essentially of silicon oxide, and a hydrophobic and oleophobic layer consisting essentially of hydrolyzable fluorinated alkylsilanes as described above. The antireflection stacking consists of an alternation of thin layers with high and low refraction indices in a dielectric material, with the last layer being one with a low index and made of silicon oxide. Said low-index layers preferably have a refraction index between 1.38 and 1.65. The so-called high-index layers have a refractive index of more than 1.85, preferably a refractive index between 2 and 2.45.

A preferred stacking of the invention is described in World Patent Application No. 92/04185, incorporated by reference in the [present] application, in which the high-index layer is a layer based on niobium oxide and the low-index layer is a layer based on silicon oxide. These layers are deposited, for example, by known vacuum techniques of the reactive cathodic atomization type. Optionally, an intermediate layer is provided between the stacking and the substrate, for example, a layer that forms a screen against the diffusion of alkalis, as described in the unpublished French Patent Application No. 95/02102, incorporated by reference in the present application.

Such a stacking has the function of decreasing the light reflection of the glass window and thus to increase its light transmission. The transmitted light/reflective light ratio of a substrate that has been treated in this manner is increased, resulting in an improvement of the visibility of objects placed behind it.

According to another variant of the invention, the functional stacking is a low emissive and/or conductive stacking. Such a stacking comprises at least one conductive layer and/or a low-emissive layer based on a metal oxide, notably a doped metal oxide, for example, indium oxide doped with tin (ITO) or tin oxide doped with fluorine ($SnO_2$:F). Such a stacking is described, for example, in European Patent Application Nos. EP 544,577 and 500,445.

According to a preferred variant of the invention, the stacking is as described in French Patent Application No. 2,704,545, which is incorporated by reference in the present application.

It comprises, besides the conductive and/or low-emissive layer based on a metal oxide/metal oxides, an internal coating with a variable geometric thickness between 90 nm and 135 nm and with a refractive index between 1.65 and 1.90. This internal layer is located between the substrate and the conductive and/or low-emissive layer. The latter is coated by an "external" layer with a geometric thickness between 80 and 110 nm and a refractive index between 1.40 and 1.65, and which essentially consists of silicon oxide. The internal coating itself preferably consists of an oxycarbide and/or silicon oxynitride.

Such a stacking, in the building sector, has the function of increasing the rate of reflection of the window glass, on the interior side of the room, in the far infrared spectrum, which is the radiation emitted by the room. This results in an improvement of the comfort of the inhabitants, notably in winter, because it reduces the losses of energy due, in part, to a leakage of this radiation to the exterior through the window glass. This product can also be used because of its properties of low resistivity, for example, to form heating window glasses by providing the supply of current, notably as a windshield or heated rear window in a car.

Naturally, any other type of functional stacking of layers or a functional layer can be considered according to the invention to the extent that the last layer, that is the one farthest removed from the substrate, is an essentially mineral layer whose density is equal to at least 80% of its constituent material.

The window glass prepared with the coatings according to the invention are, at the same time, highly hydrophobic and oleophobic. They provide good resistance to U.V. radiation, chemical aggressions, and mechanical abrasion. They are advantageously used as antirain, antifrost, and antisoiling window glasses . . . or as functional window glasses whose durability is improved presenting, in addition, hydrophobic and oleophobic properties. In particular, they are useful as window glasses in land vehicles or aircraft or for buildings.

The following nonlimiting examples illustrate the characteristics and advantages of the invention:

Example 1 compares the durability of the coating of the invention with that of an inappropriate coating.

Examples 2 and 3 illustrate the improved durability of a coating according to the invention.

Example 4 illustrates the oleophobic properties of the coating of the invention, Example 5 illustrates the improved durability of an antireflection window glass.

The durability of the coating according to the invention is measured by several tests.

The chemical resistance is measured either by the boiling-water test or by the saline mist test.

The boiling-water test consists of immersing the sample being tested in boiling demineralized water for a given period of time. The angle of contact between the drop of water and the sample is then measured.

The saline mist test is described in the ISO 9227 standard and it consists of immersing the substrate in a neutral saline mist prepared from a 50 g/L solution of the NaCl salt at a temperature of 35° C. and a pH between 6.5 and 7.2.

The resistance to abrasion is measured by the Taber test according to the ASTM D 1044-78 standard. The samples are subjected to the action of a grinding wheel of the CS-10F type under a load of 500 g. After a given number of turns, the contact angle of a drop of water is measured.

The resistance to abrasion is also measured by subjecting a 30×30 cm² sample to a sweeping with a windshield wiper. The force applied by the windshield wiper on the sample is approximately 45N; the frequency of the wiper action is ill cycles/min, with one cycle being one back-and-forth movement of the wiper. The hardness of the wiper is approximately 70 Shore A.

The hardness is measured by the "Airco" test according to which the layer to be tested is abraded for 10 turns of a grinding wheel under a load of 500 g using the Taber ASTM 1044-78 machine; the number of scratches formed is counted with a microscope for observation of the sample at a 50× magnification. The hardness is expressed by the formula:

$$D=10-0.18R$$

in which R is the mean of the number of scratches counted in four squares with a side of 2.54 cm.

The roughness of the sublayer is measured using a "Talystep" profile measuring device marketed by the Rank Precision Industry. A diamond tip barely comes into contact with the surface of the sample and it records the variations in the amplitude corresponding to the roughnesses present. For the measurements conducted, the radius of curvature of the tip is 5 microns, the load is 30 mg, and the speed is 5 microns per second. The amplitude from peak to valley, which is representative of the roughnesses observed, was measured over a length of 50 μm.

EXAMPLE 1

Samples of flowable silica-sodium-calcium glass are meticulously cleaned. The density of the glass is 2.4 g/cm$^3$.

A first series of samples is treated by means of a solution of decane containing $4\times10^{-3}$ mol/L of a perfluorosilane with the formula $CF_3$—$(CF_2)_7$—$(CH_2)_2$—$SiCl_3$. The thickness of the layer obtained, measured by X-ray reflectometry, is approximately 15 Å.

A second series of samples is prepared by depositing a layer of silica by chemical vapor deposition plasma (CVD plasma). According to the infrared spectrum, the density of the $SiO_2$ layer obtained is not high, and this sublayer is an inappropriate sublayer according to the invention. This sublayer is cleaned and covered with the same layer as the first series of samples.

In the third series, glasses coated with a sublayer of $SiO_2$ are used, which layer was obtained by bringing the substrate in contact with a solution supersaturated with silica and obtained by the addition of water and a silica gel in hydrofluoric acid until the concentration of hydrofluoric acid is equal to 2.5 mol/L. The thickness of the sublayer is approximately 450 Å and its density is approximately 2.3 g/cm$^3$, that is, it is equal to the density of the silica (crystalline structure of the crystobalite type). The sublayer, after having been cleaned, is coated with the same hydrophobic layer as for the preceding series.

The contact angles of a drop of water are, respectively, 110°, 105°, and 115°. After 2 h, then after 4 h, in boiling water, the measured angles are, respectively, 60° and less than 60° for the first series, 105° and 82° for the series corresponding to the invention, and 20° after 2 h in boiling water for the second series.

In contrast to the coatings corresponding to series 1 and 2, the coating according to the invention presents a contact angle of more than 60° after 2 h, and even after 4 h, in boiling water.

Moreover, samples corresponding to series 1 and 3 are subjected to abrasion tests.

The contact angles of a drop of water measured on the samples are as follows:

| Series | Taber turns | | |
|---|---|---|---|
| | 100 | 200 | 500 |
| 1 | 75 | 65 | <60 |
| 3 | 90 | 81 | 76 |

In addition, the windshield wiping test is conducted on series 1. After 15,000 cycles, the contact angle of a drop of water is less than 60°, with one cycle corresponding to one back-and-forth movement of the wiper.

This example illustrates the improved resistance of the sublayer according to the invention, with the contact angle being greater than 60° after an abrasion test or a chemical resistance test.

EXAMPLE 2

Three series of plates are prepared as in the preceding example, except for the type of sublayers.

The fourth series of samples comprises a sublayer of $SnO_2$ doped with fluorine deposited by liquid pyrolysis. The precursor is tin dibutyl oxide and ammonium acetate in an organic solvent as described in French Patent No. 1,036,647.

The fifth series of samples comprises plates having a sublayer of $SnO_2$ obtained by liquid pyrolysis.

The sixth series comprises plates having two sublayers. The first sublayer consists of $SiO_pC_q$ (with $1<p<2$ and $0<q<1$) deposited by CVD plasma, as well as a sublayer of $SnO_2$ doped with fluorine deposited by pyrolysis as described in French Patent Application No. 93/01545. The thickness of the assembly formed by these sublayers is 1000–4000 Å.

The densities of the sublayers are on the order of 6.3 g/cm$^3$ for series 4, 5, and 6. This should be compared to the density of the oxide, which is 6.9 g/cm$^3$. In other words, the density of the sublayers is more than 90% of that of the reference material.

The hardnesses measured according to the Airco test are, respectively, 8.9, 9.1, and 8.6 for the series 4, 5, and 6. They and greater than the hardness of glass, which is 7.3.

The roughness of the plates of series 4, 5, and 6 is 180, 240 and 300 Å. This roughness is relatively high. It is connected with the type and method of preparation of these sublayers.

These plates are then cleaned and coated with the same hydrophobic layer as in Example 1. The resistance tests are reported in the following table, which indicates the contact angles of a drop of water before and after the resistance test.

| Série ① | Initial ② | Test à l'eau bouillante (3) | | | Taber tours (4) | | |
|---|---|---|---|---|---|---|---|
| | | 2 h | 4 h | 8 h | 100 | 200 | 500 |
| 4 | 120° | 115 | 106 | 105 | 95 | 90 | 85 |
| 5 | 118 | 106 | 108 | 85 | 89 | 90 | 86 |
| 6 | 115 | 105 | 95 | 90 | 90 | 90 | 90 |

Key:
① Series
② Initial [angle]
③ Boiling-water test
④ Taber turns

The windshield wiper test is conducted on series 4. After 100,000 cycles, the contact angle of a drop of water is 90°; after 160,000 cycles, it is 80°, with one cycle corresponding to one back-and-forth motion of the wiper.

These examples show the improvement obtained using a sublayer according to the invention.

EXAMPLE 3

Three series of plates are prepared as in Example 2, with the exception of the nature of the sublayers.

Series 7, 8, and 9 correspond to sublayers based on $SiO_pC_q$, $TiO_2$, and $Ta_2O_5$.

The sublayers based on $TiO_2$ and $Ta_2O_5$ are obtained by vacuum deposition. Their thickness is on the order of several hundreds of Angstroms. The $SiO_pC_q$ layer (with $1<p<2$ and $0<q<1$) is obtained by chemical vapor deposition.

The measured densities are, respectively, 2.1, 3.6, and 7.4 for series 7, 8, and 9. The densities of the corresponding constituents are 2.3, 3.8 (crystalline structure of the anatase type), and 8.2. The density of the sublayers is equal to at least 90% [of that] of its constituent materials.

The hardness of series 8 is 8.9 and its roughness is 20 Å. The corresponding values for series 3, which is used as a basis for the comparison, are 8.4 and 20 Å.

The sublayers, after having been cleaned, are coated with a hydrophobic layer as in Example 1.

The contact angles of a drop of water on the samples are reported in the following table.

| Série ① | Initial ② | Test à l'eau bouillante (③) | | Taber tours (④) | | |
|---------|-----------|------|------|------|------|------|
|         |           | 2 h  | 4 h  | 100  | 200  | 500  |
| 3       | 115       | 105  | 82   | 90   | 80   | 76   |
| 7       | 117       | 100  | 95   | 88   | 66   | 62   |
| 8       | 118       | 96   | 92   |      |      |      |
| 9       | 110       | 79   | 77   | 92   | 88   | 86   |

Key:
① Series
② Initial [angle]
③ Boiling-water test
④ Taber turns

This example illustrates the good chemical and mechanical resistance and the good resistance to abrasion of the coatings according to the invention. This result is obtained even with a low roughness of the sublayers.

EXAMPLE 4

The contact angle of a drop of Vaseline is measured on the corresponding to series 4, 6, and 9. The results are as follows:

| Series | Initial [angle] |
|--------|-----------------|
| 4      | 85°             |
| 6      | 80°             |
| 9      | 72°             |

This example illustrates the oleophobic properties of the coatings according to the invention.

EXAMPLE 5

Two samples, bearing the reference Nos. 1 and 2, of flowable silica-sodium-calcium glass are covered with an antireflection stacking.

This stacking is a four-layered type consisting of the following sequence: glass/$Nb_2O_5$ (2)/$SiO_2$ (3)/$Nb_2O_5$ (4)/$SiO_2$ (5). The successive deposits of thin layers are made by reactive cathodic atomization assisted by a magnetic field.

The two layers of $Nb_2O_5$ with a refractive index of approximately 2.3 are obtained by reactive atomization in the presence of oxygen from niobium targets; the two layers of $SiO_2$ with a refractive index of approximately 1.47 are obtained by reactive atomization in the presence of oxygen from silicon targets doped with boron or aluminum.

The geometrical thickness in nanometers of each of the stacking layers is given in the following table:

|            | Thickness (nm) |
|------------|----------------|
| $Nb_2O_5$ (2) | 12             |
| $SiO_2$ (3)   | 38             |
| $Nb_2O_5$ (4) | 120            |
| $SiO_2$ (5)   | 87             |

On one of the samples, reference No. 1, the $SiO_2$ layer (5), after having been cleaned, is covered with a hydrophobic and oleophobic layer as described in Example 1. The thickness of the hydrophobic and oleophobic layer is 15 Å and its refractive index is equal to 1.3.

Sample 2 lacks the hydrophobic layer.

These two samples are subjected to the saline mist test. The value of the light reflection, $R_L$, is measured as a percentage, based on the illuminant $D_{65}$, with initially a perpendicular angle of incidence and after a residence time of 14 days in a saline atmosphere. The results are as follows:

| Sample | Initial $R_L$ | $R_L$ after 14 days |
|--------|---------------|---------------------|
| 1      | 0.5           | 1.0                 |
| 2      | 0.5           | 10.7                |

This example illustrates the improved durability of an antireflection window glass coated with a hydrophobic and oleophobic layer.

We claim:

1. A window glass comprising a substrate made of glass that is optionally covered, over at least a part, by one or more layers, and a coating comprising an essentially mineral sublayer and directly bonded thereto, a hydrophobic-oleophobic layer wherein the density of the mineral sublayer is equal to at least 80% of that of its constituent material, and wherein the mineral sublayer is selected from the group consisting of: $Al_2O_3$, $Ga_2O_3$, $SnO_2$, $TiO_2$, $Ta_2O_5$, $Cr_2O_3$, $ZrO_2$, $Nb_2O_5$, $In_2O_3$, $Fe_2O_3$, $CoO_3$, $V_2O_5$, $Y_2O_3$, TiN, $SiO_x$, with x being between 0 and less than 2, and $SiO_pC_q$, with $1<p<2$ and $0<q<1$, and mixtures thereof.

2. A window glass according claim 1, wherein the hardness of the sublayer is greater than that of the glass.

3. A window glass according to claim 1, wherein the sublayer thickness is between 80 and 5000 Å.

4. A window glass according to claim 1, wherein the density of the sublayer is at least 90% of the density of its constituent material.

5. A window glass according to claim 1, wherein the sublayer is obtained by pyrolysis.

6. A window glass according to claim 1, wherein the sublayer is electrically conductive and allows the evacuation of the electrostatic charge that may accumulate on the window glass.

7. A window glass according to claim 1, wherein the sublayer consists of $SnO_2$ doped with fluorine.

8. A window glass according to claim 1, wherein the hydrophobic-oleophobic layer is obtained by means of at least one hydrolyzable fluorinated alkylsilane or a mixture of hydrolyzable fluorinated alkylsilanes and, optionally, other silanes.

9. A window glass according to claim 8, wherein the fluorinated alkylsilane is a perfluoroalkylsilane having the formula:

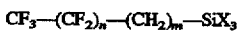

in which n is 0 to 12, m is 2 to 5, and X is a hydrolyzable group.

10. A window glass according to claim 8 or claim 10, wherein the hydrophobic layer is a layer having a thickness between 10 and 50 Å.

11. A window glass comprising a substrate made of glass and a hydrophobic-oleophobic coating that is resistant to abrasion and comprising an essentially mineral sublayer and directly bonded thereto, a hydrophobic-oleophobic layer, wherein the contact angle of a drop on the coating, having been subjected to abrasion with 500 turns of a grinding wheel according to the standard ASTM D 1044-78, is greater than 60°, and wherein the mineral sublayer is selected from the group consisting of: $Al_2O_3$, $Ga_2O_3$, $SnO_2$, $TiO_2$, $Ta_2O_5$, $Cr_2O_3$, $ZrO_2$, $Nb_2O_5$, $In_2O_3$, $Fe_2O_3$, $CoO_3$, $V_2O_5$, $Y_2O_3$, TiN, $SiO_x$, with x being between 0 and less than 2, and $SiO_pC_q$, with $1<p<2$ and $0<q<1$, and mixtures thereof.

12. A window glass comprising a substrate made of glass, having a functional stacking whose last layer is an essentially mineral layer whose density is equal to at least 80% of its constituent material, with said last layer being covered, at least in part, by a hydrophobic and oleophobic layer, directly bonded thereto, and wherein the mineral sublayer is selected from the group consisting of: $Al_2O_3$, $Ga_2O_3$, $SnO_2$, $TiO_2$, $Ta_2O_5$, $Cr_2O_3$, $ZrO_2$, $Nb_2O_5$, $In_2O_3$, $Fe_2O_3$, $CoO_3$, $V_2O_5$, $Y_2O_3$, TiN, $SiO_x$, with x being between 0 and less than 2, and $SiO_pC_q$, with $1<p<2$ and $0<q<1$, and mixtures thereof.

13. A window glass according to claim 12, wherein the hydrophobic and oleophobic layer is obtained by means of at least one hydrolyzable fluorinated alkylsilane or a mixture of hydrolyzable fluorinated alkylsilanes and, optionally, other silanes.

14. A window glass according to claim 13, wherein the functional stacking is selected from an antireflection stacking or a low emissive and/or electrically conductive stacking.

15. A method for the manufacture of a window glass according to claim 1, comprising the following steps:

deposition of a hydrophobic and oleophobic layer on a dense and essentially mineral sublayer after an optional cleaning of the latter by bringing the substrate coated by the sublayer in contact with a solution containing at least one hydrolyzable fluorinated alkylsilane in a non-polar solvent system.

16. A method for the manufacture of a window glass according to claim 1, comprising the following steps:

optional cleaning of the surface of the substrate to be coated, deposition of an essentially mineral sublayer, with the density of the sublayer being equal to at least 80% of the density of its constituent material, optional cleaning of the sublayer to be coated, deposition of a hydrophobic and oleophobic layer onto said cleaned sublayer.

* * * * *